United States Patent [19]
Suh

[11] Patent Number: 5,936,381
[45] Date of Patent: Aug. 10, 1999

[54] CHARGING APPARATUS FOR CAR STORAGE BATTERIES

[76] Inventor: Soo Chan Suh, #1-1104, Shindonga Apt.Yeomchang-dong 289, Kangsuh-gu, Seoul, Rep. of Korea

[21] Appl. No.: 09/005,725

[22] Filed: Jan. 13, 1998

[51] Int. Cl.⁶ ........................................................ H02J 7/00
[52] U.S. Cl. ................................................................ 320/104
[58] Field of Search .................................... 320/103, 104, 320/105; 363/16, 17, 28, 24, 25, 26, 97, 98, 134, 131, 132, 49, 61, 55, 56

[56] References Cited

U.S. PATENT DOCUMENTS

| | | | |
|---|---|---|---|
| 4,527,111 | 7/1985 | Branham | 320/104 |
| 4,638,236 | 1/1987 | Carr et al. | 320/104 |
| 4,641,229 | 2/1987 | Easter | 363/61 |
| 5,155,670 | 10/1992 | Brian | 363/24 |
| 5,281,904 | 1/1994 | Tomkins | 320/104 |
| 5,410,467 | 4/1995 | Smith et al. | 363/24 |
| 5,488,554 | 1/1996 | Green | 363/25 |
| 5,637,978 | 6/1997 | Kellett et al. | 320/104 |
| 5,793,185 | 8/1998 | Prelec et al. | 320/104 |

*Primary Examiner*—Peter S. Wong
*Assistant Examiner*—K. Shin
*Attorney, Agent, or Firm*—Michael N. Meller

[57] ABSTRACT

The present invention is a charging apparatus devised to make it possible with the help of another car to start a failed engine resulted from an old storage battery or from overcharging by inserting cigar jack in a car without opening the bonnet and without the issue of polarity arising. In general, enough current can't be attained even if storage batteries in two cars are connected through a cigar jack. This is due to the narrow difference between the voltage of the two storage batteries. Furthermore, sufficient current can not be attained and it takes a long time because the voltage drop caused by internal resistance in the cable is not negligible. To resolve such problems, the present invention includes a small-sized switch mode power supply, generates needed voltage from the power source and outputs the voltage overlapped to the supplying voltage, which creates an effective charging in a short time. In addition, it aims to achieve safer operation by built-in maximum current limiting circuit and voltage regulating circuit.

20 Claims, 3 Drawing Sheets

CHARGING APPARATUS FOR CAR STORAGE BATTERIES

TECHNICAL FIELD

The present invention relates to a charging apparatus for car storage batteries which enables a storage battery to be charged through a cigar jack in a car, and consequently can boost charge a discharged storage battery and start a failed engine using a simple method.

BACKGROUND OF THE INVENTION

It sometimes happens that an engine will not start not because of the age of a car but because of a shortage of electricity resulting from a driver's carelessness or mistake in conjunction with the operation and maintenance of a car. When this happens, a driver generally has an engine start by connecting a jump cable, a thick wire attached by large-scaled tongs on both ends to two cars. When using the above method, most drivers meet with the following problems.

First, drivers are reluctant to carry a jump cable in a car since jump cables are too heavy and bulky to carry, look unattractive and are not long enough. As a result, a jump cable is sometimes not available when needed.

Second, it is necessary to open the bonnets of two cars to use a jump cable. Many drivers are reluctant to do this since their hands or clothes could be stained. Furthermore, women drivers don't even have enough knowledge of the mechanics of a car to open the bonnet.

Third, battery has clear polarity. So the polarity of the two cars should be correctly connected and disconnected in due process after charging. However, drivers with limited knowledge of this mechanism have difficulty in connecting and disconnecting polarized tongs and in preventing the tongs from shorting. Unable to resolve the problem they then ask a serviceman or an expert for help, which takes up time and money.

The present invention is devised to remove those problems and to ensure safer driving. When the charging apparatus of the present invention is used, it is not necessary to open the bonnet of an engine and to force two cars to approach. Additionally, the present invention achieves a better outcome through a simple process without the issue of polarity arising.

Though the conventional invention has a similar structure in that the storage battery is charged by the cigar jack, it can't obtain enough charging current. This is due to the fact that the conventional invention just connects cigar jacks in two cars. The conventional invention causes an inefficiently narrow voltage difference between the two cars, one is to supply a power source and the other is to be supplied with the power source. It also takes a long time to obtain the necessary amount for charging because of the voltage drop resulting from internal resistance in the connecting wire. Furthermore, the shortage of charged amount sometimes makes an engine fail to start depending on the status of the storage battery.

The present invention is devised to resolve such problems.

It is therefore an object of the invention to provide a charging apparatus for car storage batteries which has a low voltage generation circuit with large current capacity within the apparatus, overlaps the voltage from the voltage generation circuit to supplying voltage from car which supplies the power source and can charge a discharged storage battery by supplying enough charging current to charge within the range of capacity of the fuse in a car.

The above-mentioned results can be fully achieved when a boost circuit is composed of a power source of storage battery. However, the power source circuit with 150 W should be installed to yield the rated voltage of the car with 12V to 15V and 10 A without consideration of the efficiency. Such a method is not practical because of the heavy manufacturing cost, size and mass. A power source generation circuit with 30 W ~40 W is necessary since the apparatus in the present invention can get the same effect only from the power source device with 3V to 4V and 10 A.

SUMMARY OF THE INVENTION

According to the present invention, there is provided a charging apparatus for car storage batteries for inserting cigar light plug into cigar jacks in two cars(one is to supply a power source and the other is to be supplied with the power source) and for charging the car to be supplied with the power source.

In detailed embodiment, the charging apparatus comprises:

a voltage converting means(4) which includes a power source of low voltage directly insulated from the input, overlaps the voltage from the voltage generation circuit to the input voltage and obtains enough charging current by securing voltage difference from two storage batteries;

a current limiting means which includes a current detecting resistance(5), generates voltage drop in both ends of the current detecting resistance when charging current from storage battery exceeds a predetermined value and lowers output current when voltage drop is higher than the voltage from dividing resistance(R3,R4) which is connected to a predetermined reference voltage (12); and a voltage regulating means which is connected to an output terminal and lowers the output voltage from dividing resistance(R1,R2) when the voltage from dividing resistance (R1,R2) is higher than the predetermined reference voltage (12).

These and other objects and novel features of the present invention will become more apparent from the following detailed description taken in conjunction with the accompanying drawings.

DETAILED DESCRIPTION OF THE PREFERRED EMBODIMENTS

An embodiment of the present invention will now be described with reference to the accompanying drawings.

Figure 1:
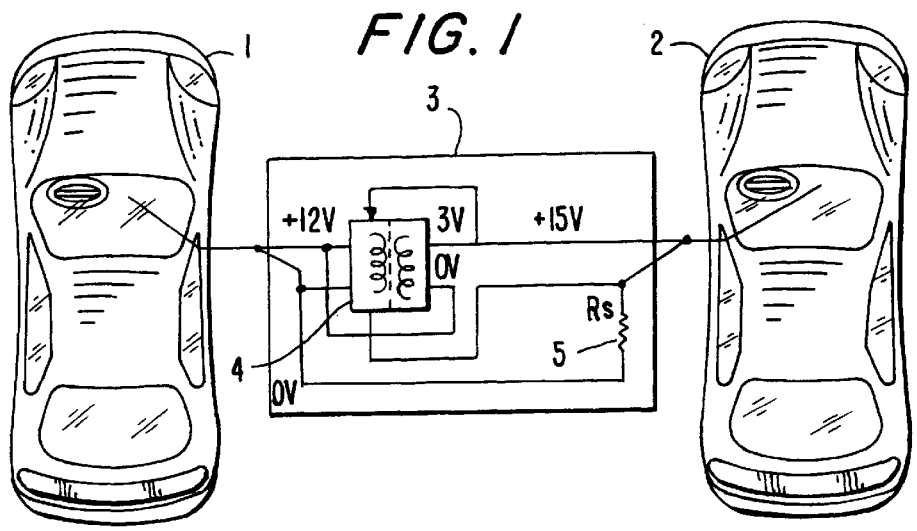
FIG. 1 is a view showing connected construction of a charging apparatus for car storage batteries according to the present invention.

FIG. 1 is a view showing connected construction of a charging apparatus for car storage batteries according to the present invention.

As shown in FIG. 1, a car in normal condition which is to supply a power source generally designated by reference numerals 1 is asked to charge itself by rotating its engine emptily in consideration of circuit draw-out from a storage battery. A car generally designated by reference numerals 2 needs charging and its starting gun(starter key) should be placed on the connecting position between a cigar jack and a storage battery(usually on the position of ACC). A power source generation circuit generally designated by reference numerals 4 generates dc-power source with 7V on loadless and with 10V on maximum. The power source generation circuit(4) is a dc—dc voltage converting circuit which is direct-currently insulated from the input with 12V and from the output with 4V. Two voltages are overlapped by connecting the cathode of the output to the anode of the input(12V) using the wiring generally designated by reference numerals 15 and consequently dc-power source can be generated to obtain enough charging current.

A charging apparatus generally designated by reference numerals 3 is an essential part in the present invention. The charging apparatus(3) includes the dc—dc voltage converting circuit(4), several safety devices and circuits with additive function. The output voltage from the charging apparatus(3) can be electronically controlled at maximum 10 A and 15.5 A. Accordingly, fuse, electric devices and electronic circuits of the two cars can be protected from abrasion, damage and malfunction.

Figure 2:
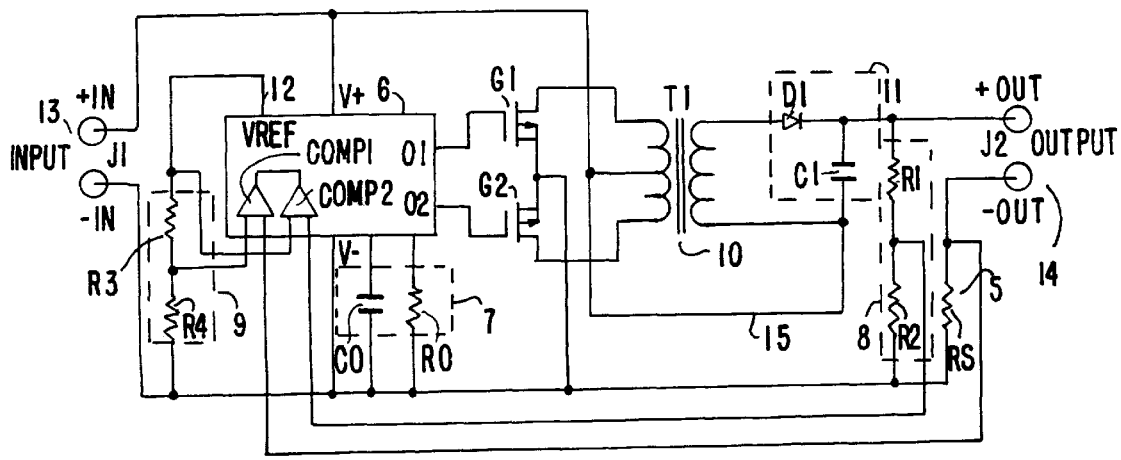
FIG. 2 is a basic circuit diagram of a charging apparatus for car storage batteries according to the present invention.

FIG. 2 is a basic circuit diagram of a charging apparatus for car storage batteries according to the present invention. When 12V input from the storage battery in a car which supplies with the power source is input to an input terminal (13), an integrated circuit(U1: 6) which is a switching mode controller is working. U1 generates alternative rectangular wave output in push-pull type through an output terminal (O1,O2). The basic wave in the U1 output is set by an oscillation element(7) and then the alternative rectangular wave output drives two electric field effect transistors(Q1, Q2).

The first winding of a transformer(T1: 10) has an intermediate terminal and therefore pull-push exitation occurs by a transistor Q1 and a transistor Q2 respectively. The electric energy of the exitation is transmitted to the second winding of the transformer(T1) and the needed dc-power source can be obtained by smoothing the current on the second winding through a rectifier(D1: 11) and a rectifying device composed of a condenser (C1).

The cathode of the rectifier(smoothing circuit: 11) is connected to the cathode of the input according to the wiring(15) and therefore the anode of the output terminal (14) is overlapped both by the voltage with 3V from the power supply and by the input voltage with 12V. As a result, enough charging voltage more than 15V can be obtained.

As mentioned above, circuits with addictive function are built in the said circuit. They are a maximum current limiting circuit and a voltage regulating circuit.

The current limiting circuit is composed of a current detecting resistance(Rs: 5), a voltage dividing circuit(9) and an output terminal generating reference voltage(VREF, 5V in this integrated circuit)(12) and a comparator(COM1). When the charging current from the storage battery connecting to the output terminal(14) exceeds a predetermined value(approximately 10 A), the current yields voltage drop on both ends of the resistance(Rs). Then, the voltage value is input to a comparator(COM1) and then compared with the current from a voltage dividing circuit(9). As a result, when the output voltage from the current detecting circuit(Rs) is higher than the one from the voltage dividing circuit, the integrated circuit(6) lowers the width of rectangular wave output by O1 and O2 and therefore also lowers the output voltage from the output terminal(14).

A voltage regulating circuit makes similar operation with the current limiting current. R1 and R2 is designed to equalize the maximum value of the set voltage from the voltage dividing circuit to the reference voltage(VREF). The output voltage from the voltage dividing circuit(8) and the reference voltage(VREF) are input and compared by a comparator(COM2). As a result, when the output voltage from the voltage dividing circuit(8) is higher than VREF, the integrated circuit (6) lowers the width rectangular wave output by O1 and O2 and thereby the output voltage from the output terminal(14) is also controlled lower.

Figure 3:
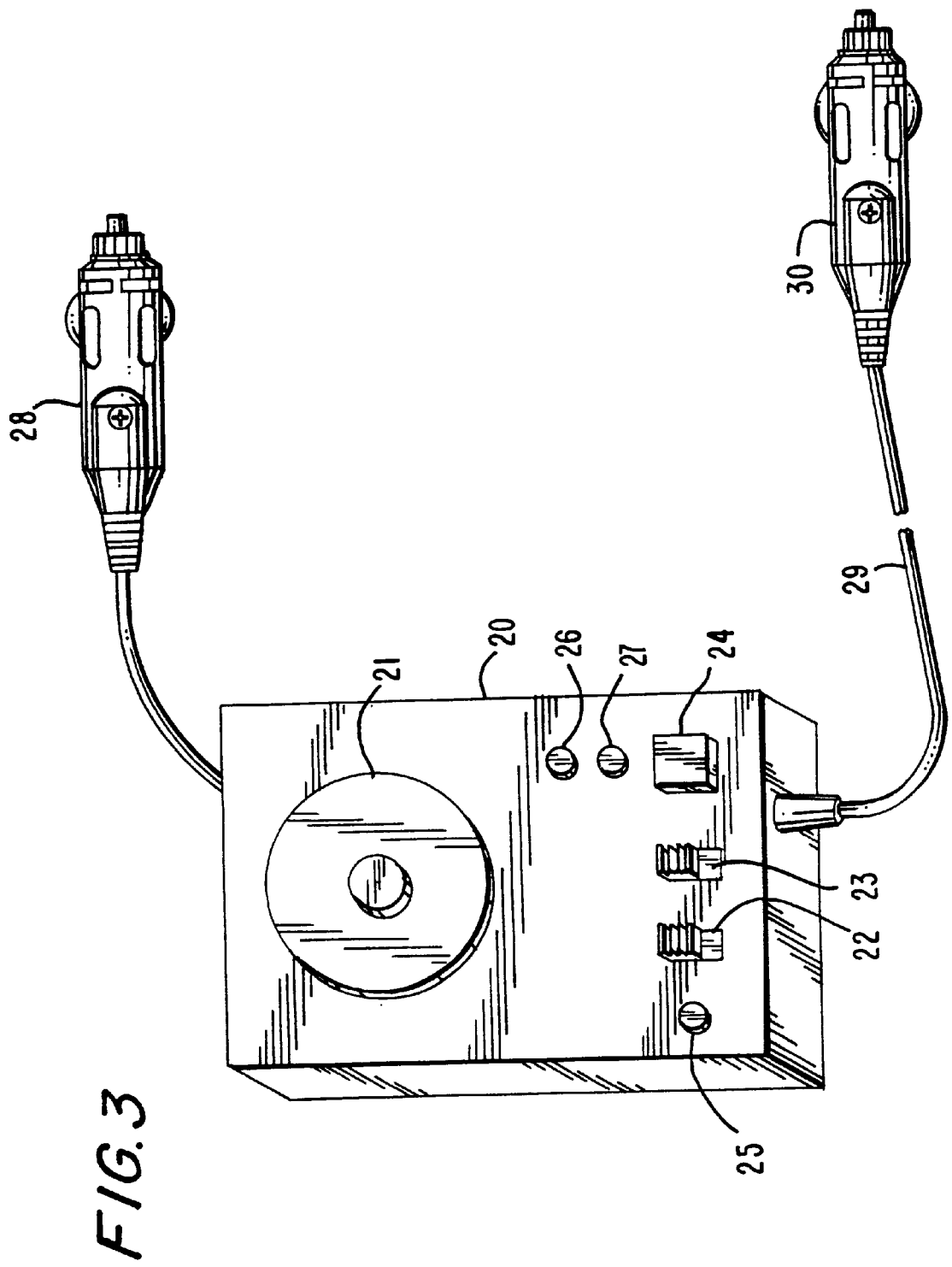
FIG. 3 is a perspective view of a charging apparatus for car storage batteries according to the present invention.

FIG. 3 is a perspective view of a charging apparatus for car storage batteries according to the present invention. Two cigar light plugs(28,30) are to be connected to a plastic case(20) and to be inserted to cigar jacks in two cars. At this time, the plug(30) is extended by a cable(29) long enough to extend the distance between the two cars. Furthermore, a light(21) is installed for emergencies or special cases and it has a built-in function selective switch(22) to turn on/off. Therefore, with the switch(22) on, the apparatus can be used as a charging apparatus for a storage battery, which is the main object of the present invention. With the switch off, a light turns on. If necessary, an installed light mode selective switch(23) works as an emergency light in an unexpected accident. While the light continues to be on with the switch on, the light turns on and off once per second with the switch off as an emergency indicating light.

A small indicating light(25) is a charge indicating light to visually inform the charging status. The reason why the charge indicating light is used is that it is necessary to prevent operational mistakes by inexperienced drivers. The charge indicating light turns on only when the whole operation is normal and charging is well-proceeded. On the contrary, the charge indicating light turns off in the event that the charging current is not flowing.

A push button(24), as a certification switch, is used to check whether enough electricity is charged in the storage battery to start an engine. A charge completion indicating light is on with the button pushed, which means the car is charged to start an engine. In comparison, a charge incompleteness indicating light is on with the button pushed, which means an engine is much more likely to fail to start.

The circuit is designed to make it possible to check the charging status by disconnecting charging whenever a charging completion certification button is pushed. The check on the status of the storage battery can be done by inserting a plug(28) to the cigar jack in the car which needs checking and then by pushing the button(24).

Figure 4:
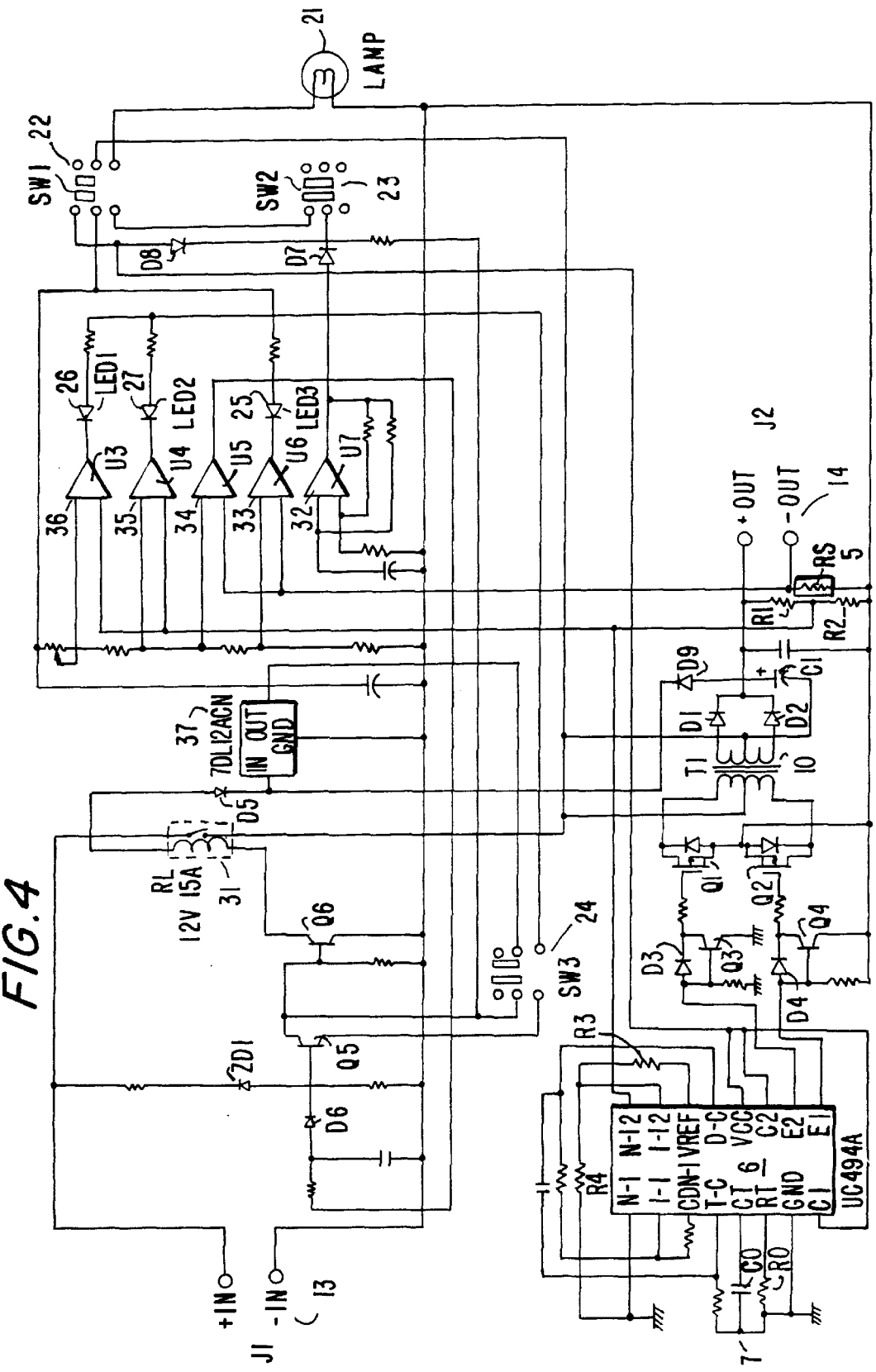
FIG. 4 is a circuit diagram showing a charging apparatus for car storage batteries according to the present invention.

FIG. 4 is a view showing a charging apparatus for car storage batteries according to the present invention.

A relay(31) can work as an interrupter to prevent possible danger. A contact terminal in the relay continues when it is in a normal condition. However, the relay is open when the input voltage is excessive, the charging current is more than 10 A or the certification switch(24) is pushed to check charging situation. In the meantime, the relay makes the light turn on and off by regularly repeating continuation and openness when an emergency indicating light is driving.

Several OP AMP as a voltage comparator is installed to compose the circuit and the comparator(32) is used as an active element in 1 Hz rectangular wave oscillator for an emergency indicating light.

The rectangular wave oscillator operates Q5 and Q6 alternatively through D7 when the said apparatus works, a selective switch(22) turns on and a light mode switch(23) is on the emergency indicating light. As a result, the relay(31) regularly continues and opens once per second. Thereby, the light(21) turns off as an emergency light. The comparator drives a charging indicating means and turns on the charging indicating means(25) when the charging current more than 1 A is flowing.

When the charging current more than 1 A flows through the current detecting resistance(Rs: 5), the corresponding current is generated and is input to the comparator(33). Then, the charging indicating light(25) is on.

A comparator(34) composes a detecting part of an over-current protecting circuit. When charging current is more than 10 A, a positive output is generated, which interrupts the relay(31). The comparators(35,36) comprise a certification circuit. Therefore, a comparator(35) is a negative output when voltage of the storage battery is lower than the set voltage. In comparison, a comparator(36) is a negative output when the voltage of storage battery is higher than the set voltage. Push the certification switch(24) for charging status and the corresponding indicator out of two indicators turns on. A voltage stabilizer(37) is necessary to provide stabilized voltage to several integrated circuits and to grant the reference voltage to the voltage comparator.

As explained above, according to the present invention, a charging apparatus for car storage batteries is provided which has a low voltage generation circuit with large current capacity within the apparatus, overlaps the voltage from the voltage generation circuit to supply voltage from car which supplies with the power source and can charge a discharged storage battery by supplying enough charging current to charge within the range of capacity of the fuse in a car.

Besides these, many modifications and variations of this embodiment may be made without departing from the novel and advantageous features of the present invention. Accordingly, all such modifications and variations are intended to be included within the scope of the appended claims.

What is claimed is:

1. A charging apparatus for car storage batteries for inserting cigar light plug into cigar jacks in two cars, one is to supply a power source and the other is to be supplied with the power source, and for charging the car to be supplied with the power source, said apparatus comprising:
    a voltage converting means, which includes a power source of low voltage directly insulated from input, for overlapping voltage from a voltage generation circuit to input voltage and for obtaining enough charging current by securing voltage difference from two storage batteries;
    a current limiting means which includes a current detecting resistance, for generating voltage drop in both ends of the current detecting resistance when charging current from storage battery exceeds a predetermined value and for lowering output current when voltage drop is higher than voltage from a first dividing resistance which is connected to a predetermined reference voltage; and
    a voltage regulating means which is connected to an output terminal and for lowering output voltage when voltage from a second dividing resistance is higher than the predetermined reference voltage.

2. A charging apparatus for car storage batteries as in claim 1, further comprising a light for emergencies and a function selective switch to turn the light on or off.

3. A charging apparatus of car storage batteries as in claim 2, which can be used as the charging apparatus for car storage batteries with the function selective switch on and can turn on the light with the function selective switch off.

4. A charging apparatus for car storage batteries as in claim 1, further comprising indicating means to visually inform charging status.

5. A charging apparatus for car storage batteries as in claim 1, further including a certification switch to check how much voltage is charged in the charging apparatus.

6. A charging apparatus for car storage batteries as in claim 1, which check the charging status of the storage battery by interrupting charging whenever the certification switch is pushed.

7. A charging apparatus for car storage batteries as in claim 1, further comprising indicating means to show whether charging is completed or not, and wherein the indicating means turns on in accordance with charging status whenever the certification switch for charging status is pushed.

8. A charging apparatus for car storage batteries as in claim 3, further comprising a light mode switch, and wherein the light continuously turns on with the said switch on and the light can be used as an emergency indicating light by alternating to turn on/off with switch off.

9. A charging apparatus for car storage batteries as in claim 2, further comprising indicating means to visually inform charging status.

10. A charging apparatus for car storage batteries as in claim 3, further comprising indicating means to visually inform charging status.

11. A charging apparatus for car storage batteries as in claim 2, further including a certification switch to check how much voltage is charged in the charging apparatus.

12. A charging apparatus for car storage batteries as in claim 3, further including a certification switch to check how much voltage is charged in the charging apparatus.

13. A charging apparatus for car storage batteries as in claim 4, further including a certification switch to check how much voltage is charged in the charging apparatus.

14. A charging apparatus for car storage batteries as in claim 2, which check the charging status of the storage battery by interrupting charging whenever the certification switch is pushed.

15. A charging apparatus for car storage batteries as in claim 3, which check the charging status of the storage battery by interrupting charging whenever the certification switch is pushed.

16. A charging apparatus for car storage batteries as in claim 4, which check the charging status of the storage battery by interrupting charging whenever the certification switch is pushed.

17. A charging apparatus for car storage batteries as in claim 5, which check the charging status of the storage battery by interrupting charging whenever the certification switch is pushed.

18. A charging apparatus for car storage batteries as in claim 2, further comprising indicating means to show whether charging is completed or not, and wherein the indicating means turns on in accordance with charging status whenever the certification switch for charging status is pushed.

19. A charging apparatus for car storage batteries as in claim 3, further comprising indicating means to show whether charging is completed or not, and wherein the indicating means turns on in accordance with charging status whenever the certification switch for charging status is pushed.

20. A charging apparatus for car storage batteries as in claim 4, further comprising indicating means to show whether charging is completed or not, and wherein the indicating means turns on in accordance with charging status whenever the certification switch for charging status is pushed.

* * * * *